(12) United States Patent
Farral et al.

(10) Patent No.: US 6,843,629 B2
(45) Date of Patent: Jan. 18, 2005

(54) BLIND FLUID FITTING/THREADED INSERT

(75) Inventors: Kim George Farral, Ft. Wayne, IN (US); Barclay H. Hurst, Leo, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 49 days.

(21) Appl. No.: 10/243,395

(22) Filed: Sep. 13, 2002

(65) Prior Publication Data

US 2004/0052608 A1 Mar. 18, 2004

(51) Int. Cl.[7] .............................................. F16B 37/12
(52) U.S. Cl. ...................................... 411/178; 411/395
(58) Field of Search ................................ 411/178, 395; 403/299

(56) References Cited

U.S. PATENT DOCUMENTS

| | | | |
|---|---|---|---|
| 131,408 A | 9/1872 | Peacock | |
| 1,678,927 A | 7/1928 | Weatherhead, Jr. | |
| 2,059,040 A | * 10/1936 | Scholtes | 285/251 |
| 2,221,141 A | * 11/1940 | Kindt | 403/360 |
| 2,405,927 A | 8/1946 | Tornblom | |
| 2,609,638 A | * 9/1952 | Lindenmeyer | 446/126 |
| 3,356,255 A | 12/1967 | Zavertnik et al. | |
| 3,434,743 A | 3/1969 | Boeker | |
| 3,472,301 A | 10/1969 | Pearce, Jr. | |
| 3,578,285 A | 5/1971 | Carlton | |
| 3,646,981 A | * 3/1972 | Barnes | 411/82 |
| 3,897,713 A | * 8/1975 | Gugle | 411/389 |
| 4,015,504 A | * 4/1977 | Rosan et al. | 411/389 |
| 4,146,207 A | 3/1979 | Rofe | |
| 4,216,349 A | 8/1980 | Wium | |
| 4,420,281 A | * 12/1983 | Dehoff | 411/392 |
| 4,470,577 A | 9/1984 | Warwick | |
| 4,662,775 A | * 5/1987 | Faul | 403/365 |
| 4,941,785 A | * 7/1990 | Witten | 411/82 |
| 5,080,542 A | 1/1992 | Sheahan | |
| 5,249,899 A | 10/1993 | Wilson | |
| 5,265,994 A | 11/1993 | Johnston et al. | |
| 5,487,507 A | 1/1996 | McDonald et al. | |
| 5,547,323 A | * 8/1996 | Fang | 411/178 |
| 5,560,457 A | 10/1996 | Rike | |
| 5,661,265 A | 8/1997 | Yarbrough et al. | |
| 5,749,788 A | * 5/1998 | Bourque | 473/44 |
| 6,075,206 A | 6/2000 | Walker | |
| 6,147,298 A | 11/2000 | Mina et al. | |
| 6,478,518 B1 | * 11/2002 | Hwang | 411/104 |

* cited by examiner

Primary Examiner—Gary S. Hartmann
(74) Attorney, Agent, or Firm—RatnerPrestia

(57) ABSTRACT

The present invention includes a device for providing a blind hole for making a removable connection to an enclosure. The device has a cylindrical shaft with a proximal portion and a distal portion. A head is formed at the distal portion of the shaft. The proximal portion of the shaft has external threads, which may by threaded into a hole of the enclosure. The proximal portion also has a tapped bore, axially formed in the shaft, which has internal threads to receive another threaded device. The tapped bore is closed at the distal portion, such that when it receives the other threaded device, the other device does not intrude into the enclosure.

8 Claims, 3 Drawing Sheets

//BLIND FLUID FITTING/THREADED INSERT

FIELD OF THE INVENTION

This invention relates, in general, to fasteners, and, in particular, to an externally threaded, tapped device for insertion into a mating threaded hole of an enclosure.

BACKGROUND OF THE INVENTION

In commercial and industrial applications, it is common practice to maintain a sealed environment within an enclosure, such as an electrical chassis. The enclosure may contain fluids and require equalization of internal pressure, draining of excess fluid, or replacing of existing fluid. The enclosure may also require that an external device be removably attached to it without contaminating or disrupting the environment within the enclosure.

It is known to have access at a low point in an enclosure through a drain hole. Any opening in the sealed enclosure permits debris, dust, and other contaminants to enter inside the enclosure and damage the contents therein. U.S. Pat. Nos. 3,356,255 and 6,147,298 are examples of devices that include drain holes for bleeding fluid from inside an enclosure. These devices, which are threaded into the enclosure, are relatively large in size and are used in applications where weight and size are not important factors.

A need exists for a threaded device of relatively small size and weight that may be inserted into an enclosure to provide bleeding of fluid from the interior environment. A need also exists for a device that may be inserted into an enclosure for accommodating another device to be removably attached to the enclosure, without contaminating or disrupting the interior environment. This invention addresses these needs.

SUMMARY OF THE INVENTION

The present invention includes a device for providing a blind hole for making a removable connection to an enclosure. The device has a cylindrical shaft that has a proximal portion and a distal portion. A head is formed at the distal portion of the shaft. The proximal portion of the shaft has external threads, which may by threaded into a hole of the enclosure. The proximal portion also has a tapped bore, which is axially formed in the shaft, and has internal threads that may receive another threaded device. The tapped bore is closed at the distal portion, such that when it receives the other threaded device, the other device does not intrude into the enclosure.

In another embodiment of the invention, a through-hole is included in the device. The through-hole is formed transversely through the cylindrical shaft at the distal portion. The through-hole is in fluid communication with the tapped bore. When the device is threaded into the enclosure with the head disposed externally of the enclosure, the through-hole provides drainage of fluid from within the enclosure.

It is understood that the foregoing general description and the following detailed description are exemplary, but are not restrictive, of the invention.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

Figure 1:
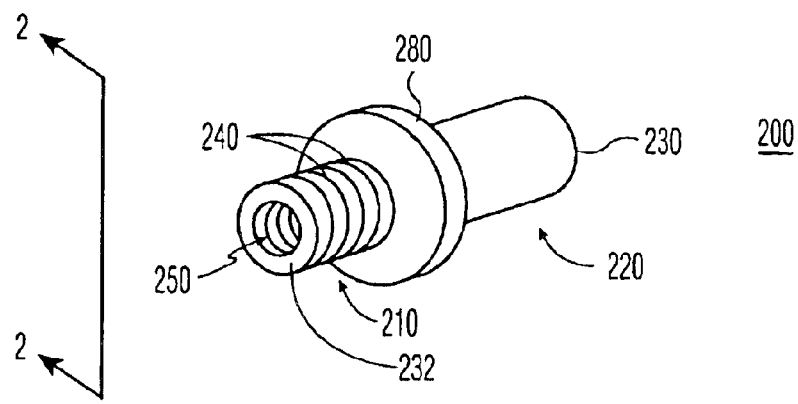
FIG. 1 is a perspective view of an externally threaded, tapped device, according to an embodiment of the present invention.
Figure 2:
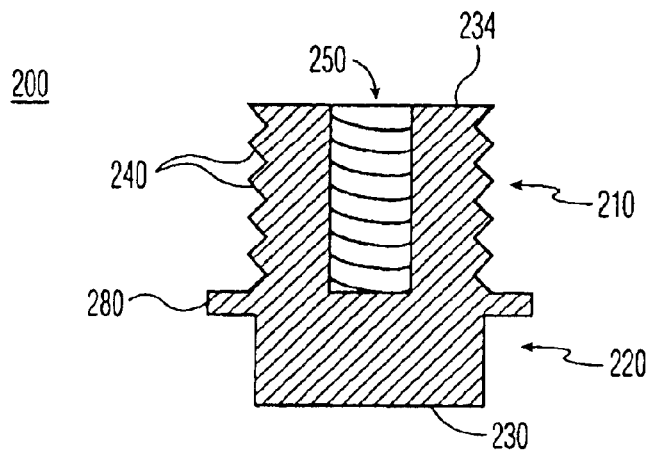
FIG. 2 is a cross-section view taken along line II—II of the device of FIG. 1.

Referring to FIGS. 1 and 2, there is shown device 200 for providing a blind hole for making a removable connection to an enclosure. Device 200, which may be made from passivated stainless steel or other metallic compounds, includes a cylindrical shaft having proximal portion 210 and distal portion 220. Head 230 is formed at the distal portion of the shaft, terminating at flange 280. External threads 240, adapted for threading into a mating threaded bore, are formed at the proximal portion of the shaft. External threads 240 extend between end 232 and flange 280, as shown. External threads 240 include a fine pitch, varying from a pitch of M6×0.75 to a pitch of M3×0.35.

It will be appreciated that device 200 is relatively small having longitudinal dimensions, such as a 6 mm length for head 230, a 0.5 mm length for flange 280 and a 6 mm length for the externally threaded proximal portion 210. The radial dimensions of device 200, for example, may include a 6 mm diameter for head 230, an 8 mm diameter for flange 280 and a 6 mm diameter for the externally threaded proximal portion 210.

A tapped bore, generally designated as 250, is axially formed at the proximal portion of the shaft. The tapped bore is open at end 232 and closed at distal portion 220. The tapped bore includes a fine pitch, varying from a pitch of M4×0.7 to a pitch of M1×0.25. The tapped bore may have a longitudinal dimension of 7.5 mm and a diameter of 4 mm. A thin wall 234 is formed between the inside surface of tapped bore 250 and the external threaded surface of proximal portion 210. Wall 234 may have a thickness of 2 mm, for example.

Figure 3:
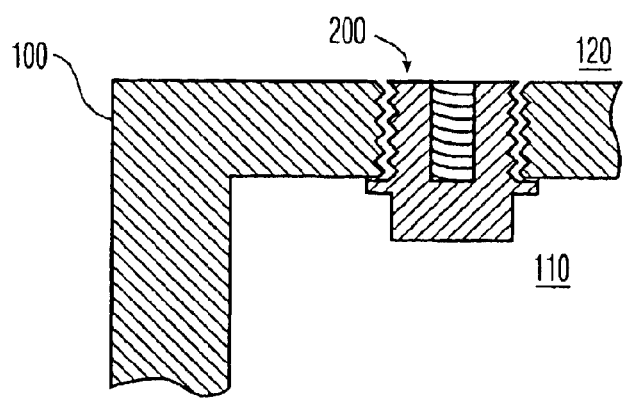
FIG. 3 is a cross-section view of the device of FIG. 1 inserted into an enclosure, illustrating a tapped bore of the device that is blind to the internal environment of the enclosure, in accordance with an embodiment of the invention.

Referring next to FIG. 3, device 200 is shown inserted into a mating threaded bore of a wall of enclosure 100. As shown, enclosure 100 includes exterior portion 120 and interior portion 110. Interior portion 110 may be sealed to prevent contamination from the environment of exterior portion 120. Enclosure 100, for example, may be an electrical chassis for protecting electronic components that are housed within interior portion 110 from possible contaminates residing in exterior portion 120.

In one embodiment of the invention, shown in FIG. 3, device 200 is threaded from the interior portion of the enclosure into a mating threaded bore of a wall of enclosure 100. Flange 280 is shown seated on the interior surface of the wall of the enclosure. The length dimension of the externally threaded distal portion of device 200 may be substantially similar to the thickness dimension of the wall of enclosure 100, thereby allowing end 232 to be flush with the exterior surface of enclosure 100 and exposing tapped bore 250 to exterior portion 120. In this manner, another device (not shown) may be removably connected to enclosure 100 by inserting the other device into tapped bore 250. For example, the other device may be a ground terminal, which may be removably connected to enclosure 100 by threading the ground terminal into tapped bore 250. Because the tapped bore is closed or blind at the distal portion of device 200, the invention advantageously allows a removable connection of another device to enclosure 100 without detrimental exposure to the interior portion of the enclosure.

In different embodiments of the invention, device 200 may be formed with or without flange 280. When formed with flange 280, a gasket may be included between the flange and the interior surface of the enclosure for increased sealing protection. When formed without flange 280, a thread sealant may be applied between the external threads of device 200 and the mating bore disposed in the wall of enclosure 100 for additional sealing strength. Of course, both a gasket and a sealant may be used in the same application. A variety of permanent or nonpermanent sealing compounds may be used to form either a lasting or temporary seal between the device and the enclosure.

Although shown having external threads 240 for threading into the wall of enclosure 100, it will be understood that device 200 may be secured to enclosure 100 in other ways. For example, the device with bayonets affixed to its proximal portion may be forced into a mating bore of the enclosure, thereby securely locking the device to the enclosure. The device may also be fastened to the enclosure by a captive spring, using a ¼ turn in one direction to secure the device to the enclosure. The device may also include locking threads. In addition, the device may be externally swaged, welded, soldered, or bayoneted instead of being threaded into the enclosure.

Although device 200 is shown in FIGS. 1 and 2 with external threads formed on the entire surface of the proximal portion, it will be appreciated that the device may be formed with partial external threads. Additionally, it will be appreciated that the device may be formed with external threads on both the proximal-and distal portions, particularly when no flange is present. It will further be appreciated that the length of the proximal portion of the device may vary depending on whether a flush, recessed or protruding installation is desired.

Figure 4:
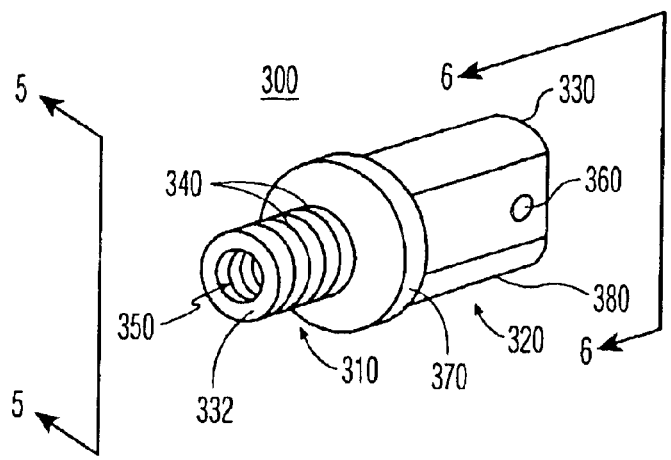
FIG. 4 is a perspective view of an externally threaded, tapped device, including a through-hole at a blind end of the device, according to an embodiment of the present invention.
Figure 5:
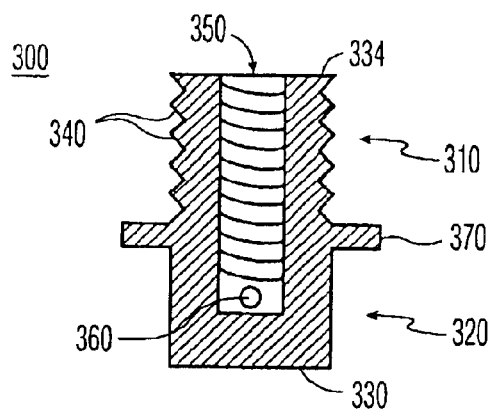
FIG. 5 is a cross-section view taken along line V—V of FIG. 4.

Referring next to FIGS. 4 and 5, another embodiment of the present invention is shown. As shown, device 300 provides drainage or bleeding of fluid from within an enclosure. Similar to device 200, the device includes a cylindrical shaft having proximal portion 310 and distal portion 320. Head 330 is formed at the distal portion of the shaft, terminating at flange 370. External threads 340 include a pitch that may be similar to the external threads of device 200. Device 300 is relatively small having longitudinal dimensions and radial dimensions similar to device 200.

A tapped bore, generally designated as 350, is axially formed at the proximal portion of the shaft. The tapped bore is open at end 332 and, similar to the tapped bore of device 200, continues into the distal portion of the shaft. Wall 334, formed between tapped bore 350 and the external threaded surface of proximal portion 310, is similar in thickness to wall 234 of device 200.

Figure 7:
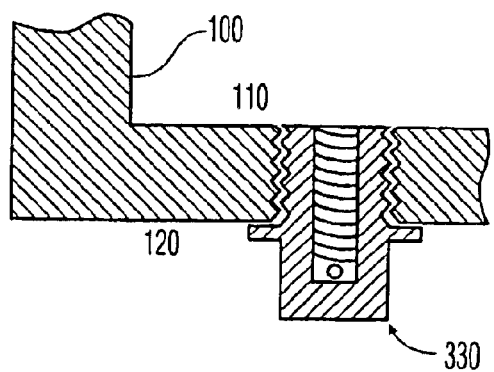
FIG. 7 is a cross-section view of the device of FIG. 4 inserted into an enclosure, illustrating the blind end of the device disposed externally of the enclosure.

As best shown in FIGS. 4 and 5, the cylindrical shaft at distal portion 320 includes a transversely formed throughhole 360 that communicates with tapped bore 350. In this manner, the through-hole may provide an outlet for drainage of fluid from an interior of enclosure 100, as shown in FIG. 7. So that drainage of fluid may be provided, device 300 may be threaded into a mating threaded bore in a wall of enclosure 100 from exterior portion 120 toward interior portion 110. Device 300 may be threaded into the wall at any location that allows drainage through gravity from the interior of the enclosure.

It will be appreciated that device 300 may be the same as device 200, with the addition of the transverse through-hole. The invention thus provides a device that may be used as (1) a blind threaded insert for removably connecting another device to an enclosure and (2) a threaded insert with the addition of a transverse through-hole for fluid drainage.

Figure 6A:
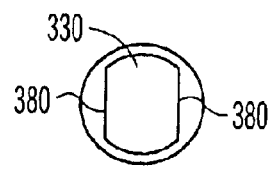
FIG. 6a is a planar view of the blind end of the device of FIG. 4 taken along line VI—VI, in accordance with an embodiment of the invention.
Figure 6B:
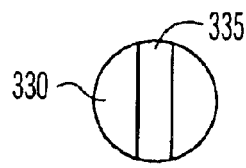
FIG. 6b is a planar view of the blind end of the device of FIG. 4 taken along line VI—VI, in accordance with another embodiment of the invention.

Device 300 (or device 200) may be threaded into the wall of an enclosure by hand, with or without tools. Referring now to FIGS. 4 and 6a, there is shown head 330, including flattened sides 380 for receiving fingers of a hand to thread the device into the wall of the enclosure. In a different embodiment, FIG. 6b depicts a circular head (similar to head 230 of device 200) including slot 335 for threading the device with a screwdriver (not shown).

In different embodiments of the invention, device 300 may be formed with or without flange 370 and may be fastened to the wall of an enclosure with or without additional sealing compounds, as previously described for device 200. It will further be appreciated that device 300 may include a blind axial bore that is not tapped to produce internal threads.

Figure 8:
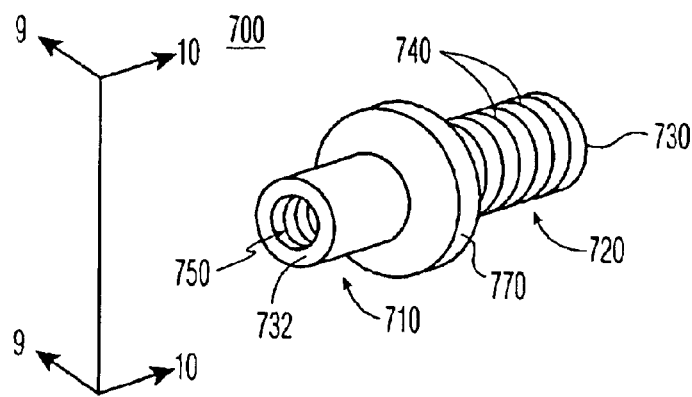
FIG. 8 is a perspective view of an externally threaded, tapped device, according to yet another embodiment of the present invention.
Figure 9:
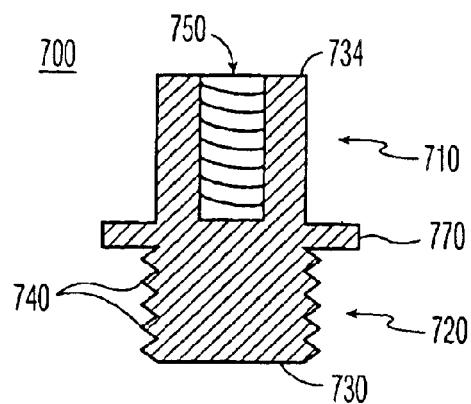
FIG. 9 is a cross-section view taken along line IX—IX of the device of FIG. 8.

Another embodiment of the invention may be seen by referring to FIGS. 8 and 9. Device 700, which may be manufactured from passivated stainless steel or other metallic compounds, includes a cylindrical shaft having proximal portion 710 and distal portion 720. External threads 740 are formed at the distal portion of the shaft, terminating at flange 770. As shown, device 700 is similar to device 200, except that external threads 740 are formed on the external surface of distal portion 720 (device 200 has external threads formed on the external surface of proximal portion 210). Device 700 includes blind tapped bore 750 and is adapted for providing a removable connection of another device (not shown) to an enclosure.

Device 700 is relatively small having longitudinal dimensions and radial dimensions that may be similar to device 200. A tapped bore, generally designated as 750, is axially formed at the proximal portion of the shaft. The tapped bore is open at end 732 and closed at distal portion 720. The tapped bore includes a pitch that may be similar to the pitch of tapped bore 250 of device 200. Wall 734 is formed between the interior surface of tapped bore 750 and the external surface of proximal portion 710.

It will be appreciated that device 700 may be threaded into a mating hole of a wall of an enclosure (such as enclosure 100) from the exterior of the enclosure (device 200, on the other hand, is shown threaded into the wall of enclosure 100 from the interior of the enclosure).

Figure 10A:
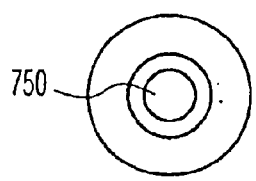
FIG. 10a is a planar view of an open end of the device of FIG. 8 taken along line X—X, in accordance with an embodiment of the invention.
Figure 10B:
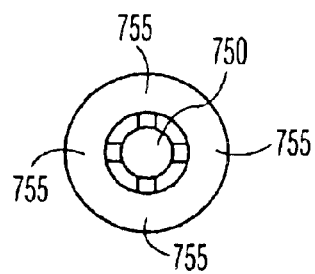
FIGS. 10b and 10c are planar views of other embodiments of the open end of the device of FIG. 8 taken along line X—X.
Figure 10C:
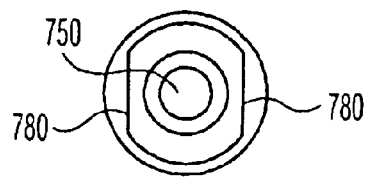

Referring now to FIG. 10*a*, there is shown a planar view of end 732 of device 700, illustrating bore 750 concentrically located in proximal portion 710. FIG. 10*b* depicts a different embodiment of the invention, in which end 732 includes a pair of slots 755 for receiving a screwdriver to aid in the threading of the device into an enclosure. FIG. 10*c* illustrates yet another embodiment including flattened sides 780 at the proximal portion for receiving fingers of a hand for threading the device into the enclosure without tools.

Device 700 may be formed with or without flange 770 as previously described with respect to devices 200 and 300. Other modifications previously described with respect to devices 200 and 300 also may be incorporated into device 700.

Although the invention is illustrated and described herein with reference to specific embodiments, the invention is not intended to be limited to the details shown. Rather, various modifications may be made in the details within the scope and range of equivalents of the claims and without departing from the invention. Other dimensions and different pitches may be used. The pitch may be metric or imperial.

What is claimed:

1. A combination of an enclosure and device for providing a blind hole and removable connection to the enclosure, the combination comprising:

a threaded opening extending through the enclosure;

the device including a cylindrical shaft having a proximal portion and a distal portion;

a head formed at the distal portion of the shaft;

external threads formed on an external periphery of the proximal portion of the shaft, said external threads adapted to be removably threaded with said threaded opening;

a bore having internal threads formed therein for removably receiving a threaded member in said proximal portion of the shaft, said bore having a closed end adjacent the distal portion;

a through-hole extending transversely to said bore, said through-hole providing fluid communication between said bore and an external periphery of said head.

2. The combination of claim 1 wherein the device includes a flange formed on said shaft between said head and said external threads.

3. The combination of claim 1 wherein the device includes; a flange transversely extending from the shaft and disposed between the proximal portion and the distal portion for seating the device from an exterior of the enclosure.

4. The combination of claim 1 wherein the external threads include a fine pitch of approximately M6×0.75 and the internal threads of the bore include a fine pitch of approximately M4×0.7.

5. The combination of claim 1 wherein the shaft includes a length dimension of the distal portion similar to a thickness dimension of a wall of the enclosure.

6. The combination of claim 1 wherein the device is formed from passivated stainless steel.

7. The combination of claim 1 wherein the head includes a slot for receiving a screwdriver for threading the external threads into a wall of the enclosure.

8. The combination of claim 1 wherein the device is threaded into the threaded opening of the enclosure with the head and the through-hole disposed externally of the enclosure, and the through-hole provides drainage of fluid from within the enclosure.

* * * * *